United States Patent Office 3,554,588
Patented Jan. 12, 1971

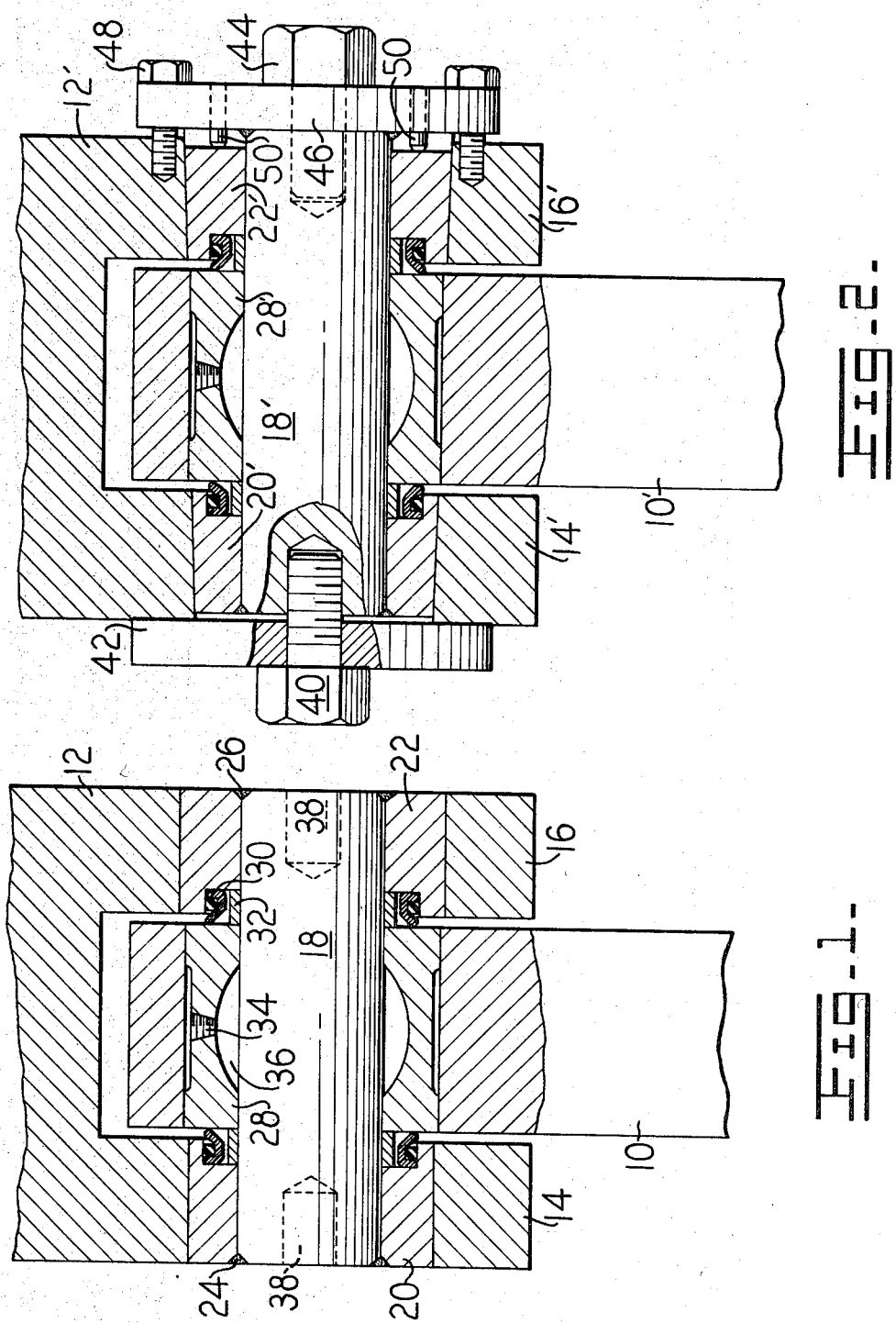

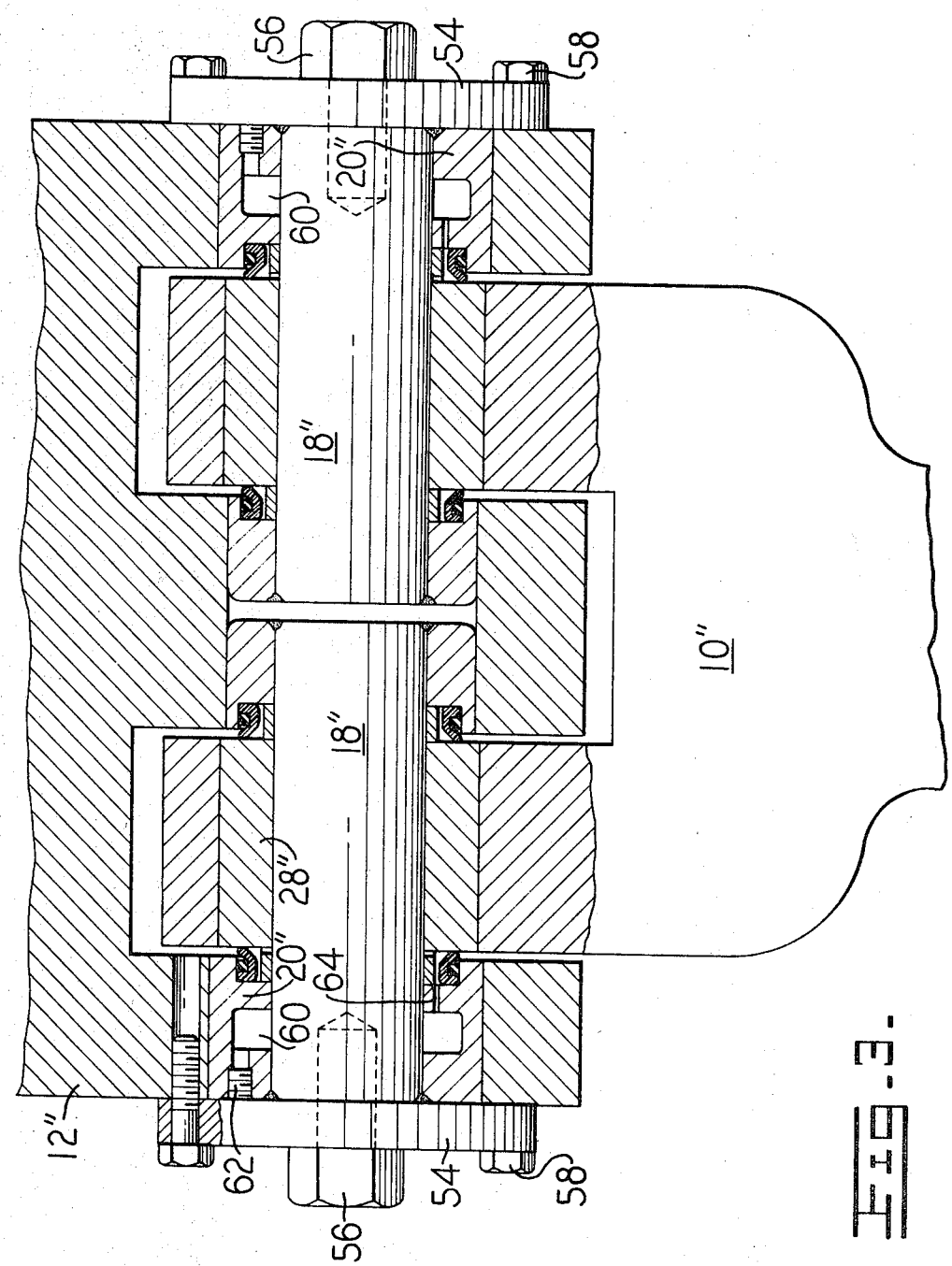

3,554,588
CARTRIDGE TYPE HINGE ASSEMBLY
Harold L. Reinsma, Dunlap, Ill., and Ronald E. Adams, Enterprise, Kans., assignors to Caterpillar Tractor Co., Peoria, Ill., a corporation of California
Filed Sept. 4, 1969, Ser. No. 855,219
Int. Cl. F16c 11/00
U.S. Cl. 287—100          7 Claims

ABSTRACT OF THE DISCLOSURE

A hinge assembly for use between articulated members which is made up of preassembled relatively rotatable and permanently lubricated and sealed parts capable of being completely assembled in cartridge form for later application to their useful environment between articulated members.

---

Examples of cartridge type hinge assemblies are disclosed in our assignee's co-pending applications for U.S. patents of Reinsma et al., Ser. No. 677,349, now Pat. No. 3,463,560 and Lee et al., Ser. No. 743,237.

The present invention is an improvement over the devices disclosed in said applications in that it is extremely simple and durable and can be completely assembled and tested as a bench operation and thereafter assembled into its useful position without possibility of losing its preadjustment.

The invention is described herein in a form designed for use in the articulated joints of the lift and tilt mechanism of a bucket type loader, but it will prove useful in many other specific applications.

The exact construction of the hinge assembly embodying the present invention and modifications thereof are described in the following specification by reference to the accompanying drawings.

In the drawings:

FIG. 1 is a central sectional view through a pair of articulately connected members including the cartridge type hinge assembly of the present invention.

FIG. 2 is a view like FIG. 1 but illustrating a modified form of the same invention, and FIG. 3 is a similar sectional view through a further modification of the invention.

FIG. 1 shows a lever 10 disposed within the bifurcated end of a second lever or bracket shown at 12. The bifurcated member 12 has spaced apart portions 14 and 16 between which the lever 10 is disposed and the three parts have coaxially aligned perforations for reception of the cartridge type hinge assembly. The assembly includes a solid cylindrical pin element 18 with a bushing 20 welded to one of its ends and a bushing 22 welded to its opposite end, the welds being illustrated at 24 and 26 respectively. Rotatable about the pin 18 and disposed between the bushings 20 and 22 is a bushing 28. All of the bushings are pressed fitted into the bores of the parts with which they are associated. In order to facilitate assembly of the cartridge structure into the operable position shown, the bushings are graduated in size as are the openings within which they are fitted. Thus, with the smaller bushing 20 at the left side and the larger bushing 22 at the right side, the cartridge may be positioned for press fitting of all of the bushings simultaneously.

Suitable seals 30 are provided between the two end bushings and the central rotatable bushing and spacers 32 prevent longitudinal movement of the rotatable bushing with respect to the pin which movement might damage or cause leakage at the seals. Lifetime lubricant for the hinge pin may be introduced through an opening closed by a threaded plug illustrated at 34 before assembly of the cartridge into the articulated members. The lubricant is retained within a reservoir which consists of an annular groove 36 formed within the bushing 28.

Because the end bushings 20 and 22 are welded to the pin 18 and because the pin is of solid construction, save for threaded openings 38 in its ends for the reception of tools used for inserting and extracting the cartridge, an assembly of constant dimension with exceptional strength is provided. Furthermore, because the assembly is a so-called shop or bench assembly, it is capable of being inspected and tested before it is used. This is important because even slight leakage of a seal during operation of the machine would result in failure of the joint and costly down time for the entire machine.

A modification of the invention as shown in FIG. 2 wherein the same reference characters primed are employed to indicate corresponding parts. In this modification, the end bushings 20' and 22' are tapered and the openings in the ends of the bifurcated link are provided with complementary tapers so that an extremely tight fit might be obtained. In anticipation of very heavy use and shock resulting therefrom, the tapered assembly may be drawn into its tight fit as by a cap screw 40 and plate 42 at one end. Rotation of the cartridge, in the event that pounding action causes looseness, can be prevented by a cap screw 44 and plate 46 at the opposite end. The rotation is prevented by a circle of cap screws 48 holding the plate 46 against rotation with respect to the bifurcated part and pins 50 carried by the plate and projecting into suitable grooves in the end of the bushing 22'.

A modification which provides a joint for exceptionally heavy duty is illustrated in FIG. 3 wherein a lever or bracket shown at 12'' is tridental for reception of the bifurcated end of a lever 10''. Here two cartridge type assemblies similar to those of FIGS. 1 and 2 and including pins 18'' are inserted from opposite ends of the joint. The stepped dimensions of the bushings and openings into which they are fitted are progressively smaller from both sides of the joint toward the center. Additional holding means are also provided by end plates 54 secured to the pins by cap screws 56 and to the opposite sides of the tridental link by circles of cap screws 58. A modified provision for supplying lubricant to the central bushings which rotate on the pins 18'' is also shown. In this case, reservoirs 60 are provided in the form of annular grooves in the two end bushings which are represented at 20'' and lubricant is supplied through a passage closed by a threaded plug 62. Passages 64 communicate between the reservoirs 60 and the bearing surface between the pins 18'' and the bushings 28''. As in the other modifications, the end bushings are welded to the pins so that the cartridge assemblies are dimensionally stable and durable.

What is claimed is:

1. A cartridge type hinge assembly for articulately connecting one member with the bifurcated end of another member comprising a solid pin element, a bushing welded to said element adjacent each of its ends and spaced for reception in openings in the bifurcated end, and a third bushing rotatable on the pin between the spaced bushings and positioned for reception in an opening in said one member.

2. The hinge assembly of claim 1 in which one of the bushings at the ends of the pin is larger than the other and both are tapered to fit complementary tapered openings in said bifurcated end.

3. The assembly of claim 2 with a plate engaging one side of the bifurcated end and having a threaded member extending through it and into the pins to cause tight fitting of the tapers.

4. The assembly of claim 2 with a plate secured to one side of the bifurcated member, the bushing adjacent said side having a notch, and a pin on the plate engaged in said notch to prevent rotation of the assembly in the bifurcated member.

5. A cartridge type hinge assembly for connecting a member having a tridental end with a member having a bifurcated end comprising two pin and bushing assemblies inserted from opposite sides of the tridental end through openings therein, and aligned openings in the bifurcated end and terminating in the central portion of the tridental end, the bushings fitted in the tridental end are welded to the pins and those fitted in the bifurcated end are rotatable on the pins.

6. The hinge assembly of claim 1 in which one of the bushings at the ends of the pin is larger than the other and both are cylindrical and press fitted into openings in the bifurcated ends.

7. The hinge assembly of claim 1 in which the third bushing contains a reservoir for lubricant.

References Cited

UNITED STATES PATENTS

| | | | |
|---|---|---|---|
| 828,402 | 8/1906 | Hart | 287—20P |
| 1,685,019 | 9/1928 | Braddock | 74—251 |
| 2,186,540 | 1/1940 | Boulton | 287—100 |
| 3,463,560 | 8/1969 | Reinsma et al. | 305—11 |

DAVID J. WILLIAMOWSKY, Primary Examiner

A. V. KUNDRAT, Assistant Examiner

U.S. Cl. X.R.

305—58